United States Patent [19]
Yabor

[11] 3,789,867
[45] Feb. 5, 1974

[54] TIRE INFLATION VALVE WITH PRESSURE INDICATOR

[75] Inventor: Enrique M. Yabor, Miami, Fla.

[73] Assignee: David Moliver, Miami, Fla.; a part interest

[22] Filed: May 17, 1972

[21] Appl. No.: 254,057

[52] U.S. Cl. .............................. 137/227, 73/146.8
[51] Int. Cl. ....................... F16k 37/00, B60c 23/00
[58] Field of Search. 73/146.8, 146.3; 137/227, 228

[56] References Cited
UNITED STATES PATENTS
3,670,688  6/1972  Seaberg .............................. 137/227
2,343,582  3/1944  Rist.................................... 73/146.8

Primary Examiner—Donald O. Woodiel
Attorney, Agent, or Firm—Harvey B. Jacobson

[57] ABSTRACT

A operatively attached constantly ready-for-use self-contained tire valve and companion air pressure indicating device having an elongated barrel or tube with an axial bore, said tube providing a core for the overall device. A normally closed conventional-type tire valve is telescopingly fitted within the outer screw-threaded end portion of the bore and is accessible for attachment and association therewith of an air pump hose. The outer end portion of the tube is externally screw-threaded to accomodate a protective screw cap and also a valving nut for air exhausting and bleeding as hereinafter set forth. The inner end portion of the tube is embedded air-tight in a central or axial portion of a rubber adapter base. The base is peripherally grooved and adapted to be lodged and retentively anchored in an opening provided therefor in a portion of the tire rim. Cylinder means surrounds a predetermined portion of the tube and more specifically comprises inner and outer concentric cylinders with the space therebetween providing a pressurized air trapping chamber. Inner end portions of the cylinders are also embedded in the base. The base has slots or openings allowing the air from the tune to pay back into the chamber. A spring-biased piston, is confined for sliding movement in the chamber and has suitable O-rings to provide shiftable but air-tight contact between inner and outer peripheral surfaces of the piston and cylinders. The outer cylinder has a graduated scale and the coordinating piston provides an indicator for measuring association with the graduations of the scale. Exhaust ports at the outer end and an opening and closing and valving nut on a threaded portion of the tube make it possible to exhaust air from the chamber to permit accurate operation of the indicator.

5 Claims, 5 Drawing Figures

PATENTED FEB 5 1974 3,789,867

TIRE INFLATION VALVE WITH PRESSURE INDICATOR

The present invention relates to a unified self-contained tire inflation valve and complemental air pressure indicating device which functions to measure the air in any type of pneumatic tire such as, for example, bicycle tires, automobile tires, larger tires used on aircraft and similar tires used on and in association with heavy duty farm machinery and equipment.

Persons conversant with the field of endeavor under consideration are doubtless aware that air pressure measuring gauges which are retentively attached to the rim of tubeless tires and the like are generally well known. This is to say, the combination of a unified self-contained inflation valve and companion or complemental air pressure indicating device or gauge is not new. For background purposes the self-registering valve stem of Glenn A. Howe, U.S. Pat. No. 1,086,296 may well be taken into account in that the basic features and characteristics thereof are comparable, in a manner of speaking, with similar features exhibited in the invention herein disclosed. Further and if so desired reference can be made to the permanently attached gauge of R. G. Tagle et al., U.S. Pat. No. 1,856,199, wherein it will be noted that after inflation the device, being a permanent part of the tire, will naturally act at all times to indicate the exact pressure within the tire, a pointer being used in rising or falling according to the pressure variations and which lends itself to use in conjunction with conventional type pneumatic tires.

An object of the present invention, stated generally, is to structurally, functionally and in other ways improve upon permanently attached tire inflation valve and companion pressure indicating devices and, in so doing, to provide a simple, practical and structurally unique adaptation which can justly be endorsed by manufacturers, wholesalers and retailers and which enables one to quickly check the existing pressure in any one of the tires in keeping with the requirements of the situation at hand.

Briefly the device disclosed lends itself to ready and reliable use on and in combination with the rim of a pneumatic tubeless tire, said device being characterized, generally stated, by a unified self-contained tire inflation valve and the complemental component parts which are associated therewith to achieve the air pressure indicating result desired. An elongated rigid metal or equivalent valving tube serves as a centralized core of the overall device and has an axial bore extending therethrough and open at its respective inner and outer ends. A normally closed conventional type tire valve is telescopingly fitted into the outer end portion of the bore and has a screw-threaded end member or head which is removably screwed to interior threads in the outer end of said tube. The outer end portion of the tube is also provided with external screw threads to accommodate a knurled nut which is utilized as a valve and cooperates with suitable exhaust or bleeding ports, whereby to exhaust accumulated air pressure for quick and accurate reading and gauging purposes. Cylinder means is provided and is charcterized by inner and outer plastic cylinders providing a chamber between themselves. The chamber serves to accommodate a spring-loaded measuring valve which serves as an indicator and cooperates with the graduations on the scale of the transparent outer cylinder.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 2:
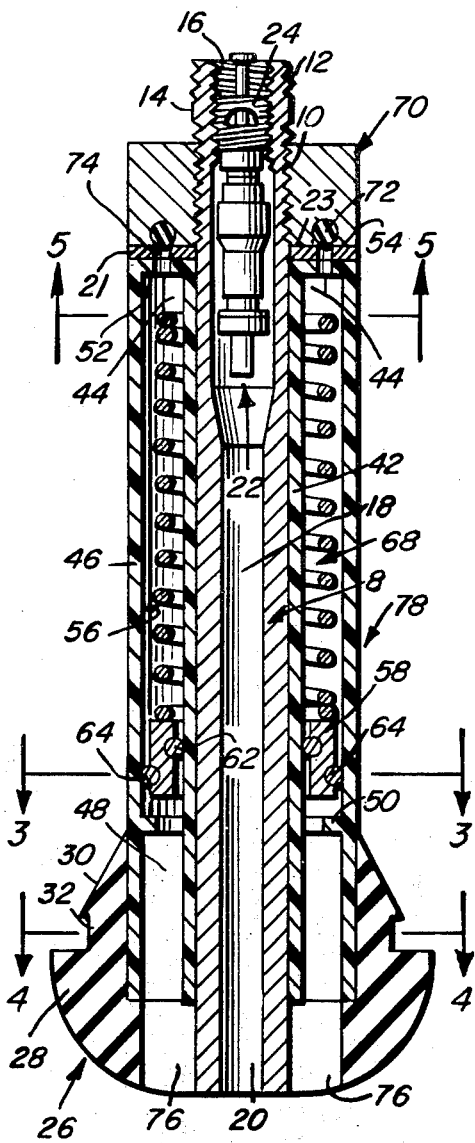
FIG. 2 is a sectional view on a suitably enlarged scale with parts in elevation taken centrally through the device and showing all of the essential component parts and how they are constructed and coordinate.
Figure 3:
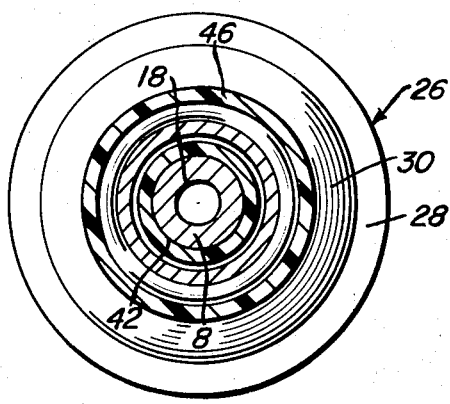
FIG. 3 is a section taken on the plane of the section line 3—3 of FIG. 1, looking in the direction of the indicating arrows.
Figure 5:
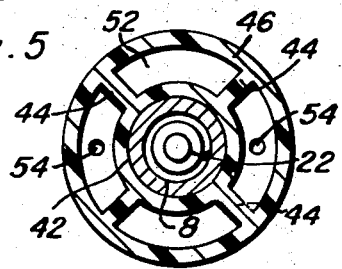

And FIG. 5 is a section on the line 5—5 of FIG. 2.

The aforementioned metal barrel or tube is denoted, as a unit, by the numeral 8. This tube has an open outer end portion with external screw threads at 10, additional screw threads at 12, a limit stop shoulder at 14 and internal screw threads at 16. The bore of the tube 8 is denoted at 18 and is herein described as being open at its inner end as at 20 and also open at the outer threaded end and provided with a flange 21 welded at 23 (or, alternatively, suitably formed as integrated part of tube 8) and which serves in a manner to be hereinafter described. The conentional type tire valve is denoted at 22 and is of regular construction and has a screw-threaded head or end portion 24 which is screwed into the threads 16 whereby to thus telescopically mount the valve 22 in a ready-to-use accessible position. The threads 12 serve to accommodate a closing cap which is not here shown. The threads 10 serve a purpose to be later described. The inner end portion of this tube is axially embedded in the hub portion of a compressibly resilient rubber or equivalent adapter base 26. This base has the usual convex surface 28 and has a tapering neck 30 and an encompassing groove or channel 32. This grooved neck is fitted in the manner shown into an opening 34 provided therefor in the flange 36 of the tire rim 38. The tubeless tire, which is of typical construction, is denoted by the numeral 40. Since this adapter base 26 is virtually the same as the so-called standard adapter the added component parts are cooperatively secured thereto and associated therewith in the manner best shown in FIG. 2.

Figure 1:
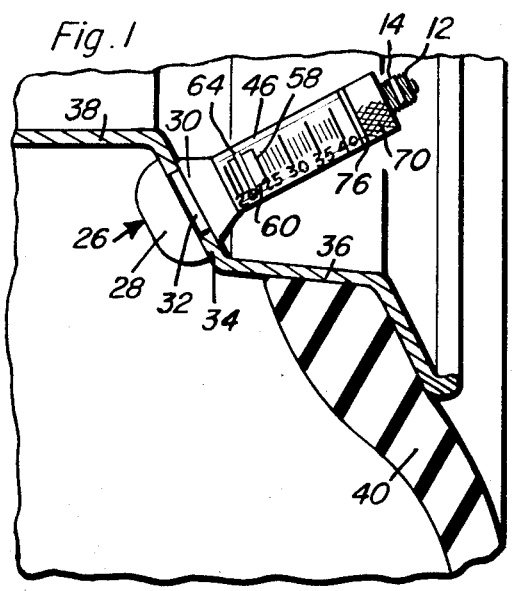
FIG. 1 is an enlarged fragmentary view with parts in section and elevation showing a portion of a tubeless tire, a flanged part of the rim and showing, what is more significant, the improved combination unified self-contained tire inflation valve and air pressure indicating gauge or device permanently attached and readied for everyday use.

The aforementioned cylinder means comprises an inner plastic cylinder 42 which snugly surrounds the exterior of the tube 8 and which is joined by radial circumferential webs 44 to the interior of the surrounding as well as spaced outer plastic cylinder 46. There are additional and similar radial circumferentially spaced webs at 48 which are located at the inner end of the structure as brought out in FIG. 2. The inner end reinforced portions of the two cylinders are embedded and bonded in an airproof manner in the hub portion of the rubber base or adapter 26 as shown in FIG. 2. Also it will be noted here that there is an internal endless flange 50 carried by the outer cylinder and which provides a ledge. The outer end portions of the respective cylinders are joined by an integral annular end member 52 which has exhaust ports formed therein as at 54. The chamber between the inner and outer cylinders is conveniently denoted in FIG. 2 by the numeral 56. This chamber serves to accomodate a ring-like collar or piston 58 which is fitted normally into the lower end portion of the chamber as illustrated in FIG. 2. This collar serves as an indicator or gauge member and in practice it is provided around its outer peripheral surface with a red marker line which will stand out and which will progressively and properly register with the graduations 60 on the measuring scale as illustrated in FIG. 1. The inner periphery of the collar or ring is provided with an O-ring 62 which is securely anchored in place and has sliding or wiping contact with the exterior surface of the inner cylinder 42. The outer peripheral surface is likewise provided with an embedded O-ring which is denoted at 64. These two rings insure satisfactory functioning of the indicator collar. In actual practice it may be necessary to use graphite or some equivalent sealing compound in association with the O-rings 62 and 64 and the surfaces of the cylinders 42 and 46. The numeral 68 designates an appropriately manufactured coil spring which bears at one end against the shiftable indicator collar 52 and bears at its other end against the aforementioned webs 44 (FIG. 2). This spring has to be of precise strength to provide the desired spring-biasing of the indicator ring 58. Inasmuch as pressure may accumulate in the chamber 56 between the collar 58 and the apertured end portion 52 it has been found desirable to provide exhaust means to discharge unwanted air.

With respect to this aspect of the concept it will be noted that the numeral 70 designates a knurled nut which is mounted on the threads 10 and can be backed up, that is unscrewed until it strikes the limit stop shoulder means 14. This nut has a surface provided with embedded O-ring means 72 cooperating with orifices or ports 74 in the aforementioned washer 21. This washer is welded at 23 to the aforementioned tube 8 and is interposed between the nut 70 and the apertured end portion 52 and consequently by unscrewing the nut any pressure that may have accumulated or backed up in the chamber 56 can be exhausted.

Figure 4:
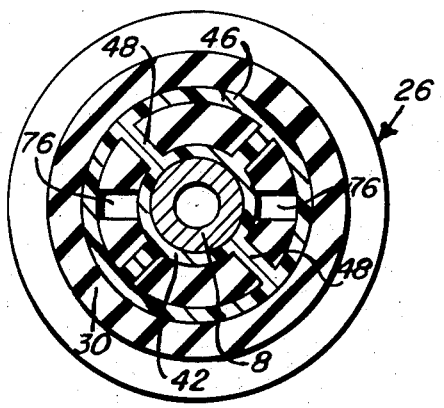
FIG. 4 is a section on the line 4—4 of FIG. 2.

With reference again to FIG. 2 it will be seen that the central body portion of the adapter base 26 is provided with a pair of diametrically opposite passages 76 (see also FIG. 4). These passages permit the air to flow from the tire and into the chamber 56 to act on the collar or piston 58 which as stated is spring-loaded and confined in the cylinder means 78. Thus the manner in which the tire is inflated by way of the valve 22 is clear and the manner in which the air discharges from the tire and operates the indicator collar or piston 58 is believed to be evident. Acordingly, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use on and in combination with the rim of a pneumatic tubeless tire, a unified self-contained tire inflation valve and complemental air pressure indicating device comprising, in combination, an elongated rigid valving tube having an axial bore extending therethrough and open at its respective inner and outer ends, a normally closed conventional-type tire valve confined and operatively mounted in the outer end portion of said bore and accessible for attaching an air pump hose thereto, a one-piece conventional type compressibly resilient adapter base adapted to be lodged and retentively anchored in an opening provided therefor in a portion of the aforementioned rim, cylinder means surrounding a predetermined portion of said tube and providing a pressuirzed air trapping chamber, said cylinder means having an inner end portion integrally embedded and secured in a central portion of said adapter base and provided with air passages communicably aligned with said chamber, and a spring-biased pressure responsive piston slidingly confined in said chamber and constituting an air pressure indicator, said cylinder means embodying an outer cylinder having a graduated measuring scale thereon with which said indicator is cooperatively oriented, said cylinder means comprising spaced parallel inner as well as outer concentric cylinders, the space between said cylinders defining said air trapping chamber, the respective inner ends of said cylinders being embedded in the central hub portion of said base, said air passages being located diametrically opposite each other and being of predetermined restricted cross-sectional dimension, and the upper and lower end portions of said inner and outer cylinders being united by integral, radial, circumferentially spaced reinforcing webs.

2. The device defined in and according to claim 1, and wherein said piston comprises a ring-like collar surrounding said inner cylinder and having an inward peripheral O-ring having an encompassing air-tight but sliding contact with an exterior surface of said inner cylinder and an outward peripheral O-ring also having air-tight but sliding contact with an interior surface of the outer cylinder.

3. The device defined in claim 1, and wherein an interior surface portion of said outer cylinder is provided with an integral endless annular flange which is located in a plane below the plane of said piston and serves as a seating ledge for said piston.

4. For use on and in combination with the rim of a pneumatic tubeless tire, a unified self-contained tire inflation valve and complemental air pressure indicating device comprising, in combination, an elongated rigid valving tube having an axial bore extending therethrough and open at its respective inner and outer ends, a normally closed conventional-type tire valve confined and operatively mounted in the outer end portion of said bore and accessible for attaching an air pump hose thereto, a one-piece conventional type compressibly resilient adapter base adapted to be lodged and retentively anchored in an opening provided therefor in a portion of the aforementioned rim, cylinder means surrounding a predetermined portion of said tube and providing a pressurized air trapping chamber, said cylinder means having an inner end portion integrally embedded and secured in a central portion of said adapter base and provided with air passages communicably aligned with said chamber, and a spring-biased pressure responsive piston slidingly confined in said chamber and constituting an air pressure indicator, said cylinder means embodying an outer cylinder having a graduated measuring scale thereon with which said indicator is cooperatively oriented, the outer end of said tube being externally screw-threaded and internally screw-threaded, said tire valve having a screw-threaded outward head portion which is plugged and screwed into said internal screw threads, the upper ends of said inner and outer cylinders being joined by an annulus having air bleeding ports communicating with said chamber, and a manually actuatable nut threaded on said external threads and normally blocking and closing said ports and being capable of being adjusted to a position to open the ports to release such air as is, at the time, trapped in the chamber between the piston and said air exhausting and bleeding ports.

5. A constantly ready-for-use valve stem and companion self-contained air pressure indicating device comprising, in combination, an elongated rigid valving tube having an axial bore extending therethrough and open at its respective inner and outer ends, said tube providing a core, a normally closed conventional-type insertable and removable tire valve telescopingly confined and operatively secured within an outer end portion of said bore and readily accessible for the attachment thereto of an air supply hose, a one-piece compressibly resilient conventional adapter base having an encompassing peripheral groove adapted to be lodged and retentively anchored in an accommodation opening provided therefor in a portion of a tubeless tire rim, cylinder means comprising an inner cylinder commensurate in length with and snugly surrounding an outer peripheral surface of said tube, a complemental outer cylinder spaced from and concentrically surrounding said inner cylinder, an apertured flange joined with and uniting corresponding outer ends of said cylinders, valving means operatively mounted on an outer end portion of the tube and cooperable with said apertured flange, a spring-biased pressure responsive piston slidingly confined for operation in the space between said cylinders, said piston comprising a ring-like collar surrounding and slidable on a coacting surface of said inner cylinder and having an inward peripheral O-ring having an encompassing air-tight but sliding contact with the coordinating exterior surface of said inner cylinder and having an outward peripheral surface provided with an O-ring also having air-tight but sliding contact with an interior surface of the outer cylinder, an interior surface of said outer cylinder being provided with an integral endless annular flange located in a plane below the plane of said piston and providing a seating ledge for said piston, the respective inner end portions of said cylinders being embedded and securely anchored in a cooperating axial portion of said base, an exterior surface of said outer cylinder having a graduated measuring scale thereon with which said indicator is cooperatively oriented.

* * * * *